(12) United States Patent
Chen et al.

(10) Patent No.: US 9,107,255 B2
(45) Date of Patent: Aug. 11, 2015

(54) LIGHT-EMITTING DIODE LIGHT TUBE DRIVING CIRCUIT

(71) Applicant: Lextar Electronics Corporation, Hsinchu (TW)

(72) Inventors: Chun-Kuang Chen, Taipei (TW); Po-Shen Chen, Hsinchu (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 14/161,997

(22) Filed: Jan. 23, 2014

(65) Prior Publication Data

US 2015/0015154 A1    Jan. 15, 2015

(30) Foreign Application Priority Data

Jul. 10, 2013    (TW) .............................. 102124724 A

(51) Int. Cl.
| | |
|---|---|
| *H05B 37/00* | (2006.01) |
| *H05B 33/08* | (2006.01) |
| *F21K 99/00* | (2010.01) |
| *H05B 37/02* | (2006.01) |
| *F21Y 103/00* | (2006.01) |

(52) U.S. Cl.
CPC .............. *H05B 33/0809* (2013.01); *F21K 9/17* (2013.01); *H05B 33/08* (2013.01); *H05B 33/0803* (2013.01); *H05B 37/02* (2013.01); *F21Y 2103/003* (2013.01); *Y02B 20/386* (2013.01)

(58) Field of Classification Search
CPC .......... F21Y 2111/005; F21Y 2103/00; F21Y 2103/003; F21K 9/17; F21K 9/175; Y02B 20/386; H05B 33/0803; H05B 33/0809

USPC ......... 362/217, 219, 221, 227, 240, 249, 251, 362/252, 800, 802, 276, 555; 315/51, 250, 315/291, 307, 308, 312, 246, 200 R, 205, 315/207, 294, 297, 362; 313/318
See application file for complete search history.

(56) References Cited

U.S. PATENT DOCUMENTS

| | | | |
|---|---|---|---|
| 7,507,001 B2 * | 3/2009 | Kit ................................ 362/276 |
| 2012/0062134 A1 | 3/2012 | Kou et al. | |
| 2012/0194086 A1 | 8/2012 | Liu et al. | |

FOREIGN PATENT DOCUMENTS

| | | |
|---|---|---|
| CN | 202535597 | 11/2012 |
| EP | 2458722 A1 | 5/2012 |
| EP | 2533607 A2 | 12/2012 |
| EP | 2587655 A2 | 5/2013 |
| TW | 201231865 | 8/2012 |

* cited by examiner

*Primary Examiner* — Douglas W Owens
*Assistant Examiner* — Borna Alaeddini
(74) *Attorney, Agent, or Firm* — Moser Taboada

(57) ABSTRACT

A light-emitting diode (LED) light tube driving circuit includes a LED driver and a rectifier unit. The LED driver is configured for receiving an operating voltage to drive at least one LED. The rectifier unit has a first input/output terminal and a second input/output terminal and is electrically coupled to an external alternating-current power source selectively by the first input/output terminal and the second input/output terminal. The rectifier unit is configured for providing the operating voltage to the LED driver. The rectifier unit further includes a first rectifier diode and a second rectifier diode.

11 Claims, 5 Drawing Sheets

US 9,107,255 B2

LIGHT-EMITTING DIODE LIGHT TUBE DRIVING CIRCUIT

RELATED APPLICATIONS

This application claims priority to Taiwan Application Serial Number 102124724, filed Jul. 10, 2013, which is herein incorporated by reference.

BACKGROUND

1. Field of Invention

The present disclosure generally relates to a light tube driving circuit, and especially relates to a light-emitting diode light tube driving circuit.

2. Description of Related Art

With the progress of the semiconductor technology, illumination brightness and illumination efficiency of light-emitting diodes (LEDs) have gradually improved. Since a LED light tube has advantages of low power consumption and long lifetime, the LED light tube has gradually replaced a traditional fluorescent tube. However, it is difficult to directly set the LED light tube on a lamp socket of the traditional fluorescent tube since the LED light tube has to coincide with a wiring way of a traditional lamp socket to perform illumination. The traditional fluorescent tube is connected in series to a ballast in the lamp socket at an input terminal of a power grid. The ballast has to be cooperatively used with a starter in the lamp socket, in which the starter in the lamp socket is set to preheat a filament and pull up a voltage across both ends of the fluorescent lamp. However, the LED light tube starts illumination without the starter. If the LED light tube is desired to be set on the traditional lamp socket, the starter in the traditional lamp socket has to be removed which results in annoyance to users.

Therefore, there is a need to directly set the LED light tube on the lamp socket of the traditional light tube without removing the starter in the traditional lamp socket, so as to save the cost and time of the retrofitting the lamp for users.

SUMMARY

An aspect of the present disclosure is to provide a light-emitting diode (LED) light tube driving circuit. The LED light tube driving circuit can be directly set on a lamp socket of a traditional light tube without removing the starter in the lamp socket, in order to improve the convenience of operation for users.

An embodiment of the present disclosure relates to a light-emitting diode (LED) light tube driving circuit used in a lamp socket with a ballast, and the LED light tube driving circuit includes a LED driver and a rectifier unit. The LED driver is configured for receiving an operating voltage to drive at least one LED. The rectifier unit has a first input/output terminal and a second input/output terminal, and is electrically coupled to an external alternating-current power source selectively through the first input/output terminal and the second input/output terminal, and is configured for providing the operating voltage to the LED driver. The rectifier unit includes a first rectifier diode and a second rectifier diode. An anode of the first rectifier diode is electrically coupled to the LED driver, and a cathode of the first rectifier diode is electrically coupled to the first input/output terminal and the second input/output terminal. An anode of the second rectifier diode is electrically coupled to the cathode of the first rectifier diode, the first input/output terminal and the second input/output terminal, and a cathode of the second rectifier diode is electrically coupled to the LED driver.

Another embodiment of the present disclosure relates to a light-emitting diode (LED) light tube driving circuit, in which the rectifier unit further has a third input/output terminal, and the rectifier unit further includes a third rectifier diode and a fourth rectifier diode. An anode of the third rectifier diode is electrically coupled to the LED driver, and a cathode of the third rectifier diode is electrically coupled to the third input/output terminal. An anode of the fourth rectifier diode is electrically coupled to the cathode of the third rectifier diode and the third input/output terminal, and a cathode of the fourth rectifier diode is electrically coupled to the LED driver.

A further embodiment of the present disclosure relates to a light-emitting diode (LED) light tube driving circuit, in which the rectifier unit further has a fourth input/output terminal, and the rectifier unit further includes a fifth rectifier diode and a sixth rectifier diode. An anode of the fifth rectifier diode is electrically coupled to the LED driver, and a cathode of the fifth rectifier diode is electrically coupled to the fourth input/output terminal. An anode of the sixth rectifier diode is electrically coupled to the cathode of the fifth rectifier diode and the fourth input/output terminal, and a cathode of the sixth rectifier diode is electrically coupled to the LED driver.

Still a further embodiment of the present disclosure relates to a light-emitting diode (LED) light tube driving circuit, in which when the LED light tube driving circuit is forward-connected to the lamp socket, the first input/output terminal is electrically coupled to the external alternating-current power source, and the fourth input/output terminal is electrically coupled to the ballast.

Yet a further embodiment of the present disclosure relates to a light-emitting diode (LED) light tube driving circuit, in which when the LED light tube driving circuit is backward-connected to the lamp socket, the second input/output terminal is electrically coupled to the external alternating-current power source, and the third input/output terminal is electrically coupled to the ballast.

A further embodiment of the present disclosure relates to a light-emitting diode (LED) light tube driving circuit, the LED light tube driving circuit further includes a starter. When the LED light tube driving circuit is forward-connected to the lamp socket, the second input/output terminal and the third input/output terminal are electrically coupled to the starter. When the LED light tube driving circuit is backward-connected to the lamp socket, the first input/output terminal and the fourth input/output terminal are electrically coupled to the starter.

Another embodiment of the present disclosure relates to a light-emitting diode (LED) light tube driving circuit used in a lamp socket with a ballast, the LED light tube driving circuit includes a LED driver, a first rectifier diode, a second rectifier diode, a third rectifier diode, a fourth rectifier diode, a fifth rectifier diode and a sixth rectifier diode. The LED driver is configured for receiving an operating voltage to drive at least one LED. An anode of the first rectifier diode is electrically coupled to the LED driver, and a cathode of the first rectifier diode is electrically coupled to a first input/output terminal and a second input/output terminal. An anode of the second rectifier diode is electrically coupled to the cathode of the first rectifier diode, the first input/output terminal and the second input/output terminal, and a cathode of the second rectifier diode is electrically coupled to the LED driver. An anode of the third rectifier diode is electrically coupled to the LED driver, and a cathode of the third rectifier diode is electrically coupled to a third input/output terminal. An anode of the fourth rectifier diode is electrically coupled to the cathode of the third rectifier diode and the third input/output terminal, and a cathode of the fourth rectifier diode is electrically coupled to the LED driver. An anode of the fifth rectifier diode is electrically coupled to the LED driver, and a cathode of the fifth rectifier diode is electrically coupled to a fourth input/output terminal. An anode of the sixth rectifier diode is electrically coupled to the cathode of the fifth rectifier diode and the fourth input/output terminal, and a cathode of the sixth rectifier diode is electrically coupled to the LED driver.

A further embodiment of the present disclosure relates to a light-emitting diode (LED) light tube driving circuit, in which when the LED light tube driving circuit is forward-connected to the lamp socket, the first input/output terminal is electrically coupled to an external alternating-current power source, and the fourth input/output terminal is electrically coupled to the ballast.

Still a further embodiment of the present disclosure relates to a light-emitting diode (LED) light tube driving circuit, in which when the LED light tube driving circuit is backward-connected to the lamp socket, the second input/output terminal is electrically coupled to an external alternating-current power source, and the third input/output terminal is electrically coupled to the ballast.

Yet a further embodiment of the present disclosure relates to a light-emitting diode (LED) light tube driving circuit, the LED light tube driving circuit further includes a starter. When the LED light tube driving circuit is forward-connected to the lamp socket, the second input/output terminal and the third input/output terminal are electrically coupled to the starter. When the LED light tube driving circuit is backward-connected to the lamp socket, the first input/output terminal and the fourth input/output terminal are electrically coupled to the starter.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

Figure 1:
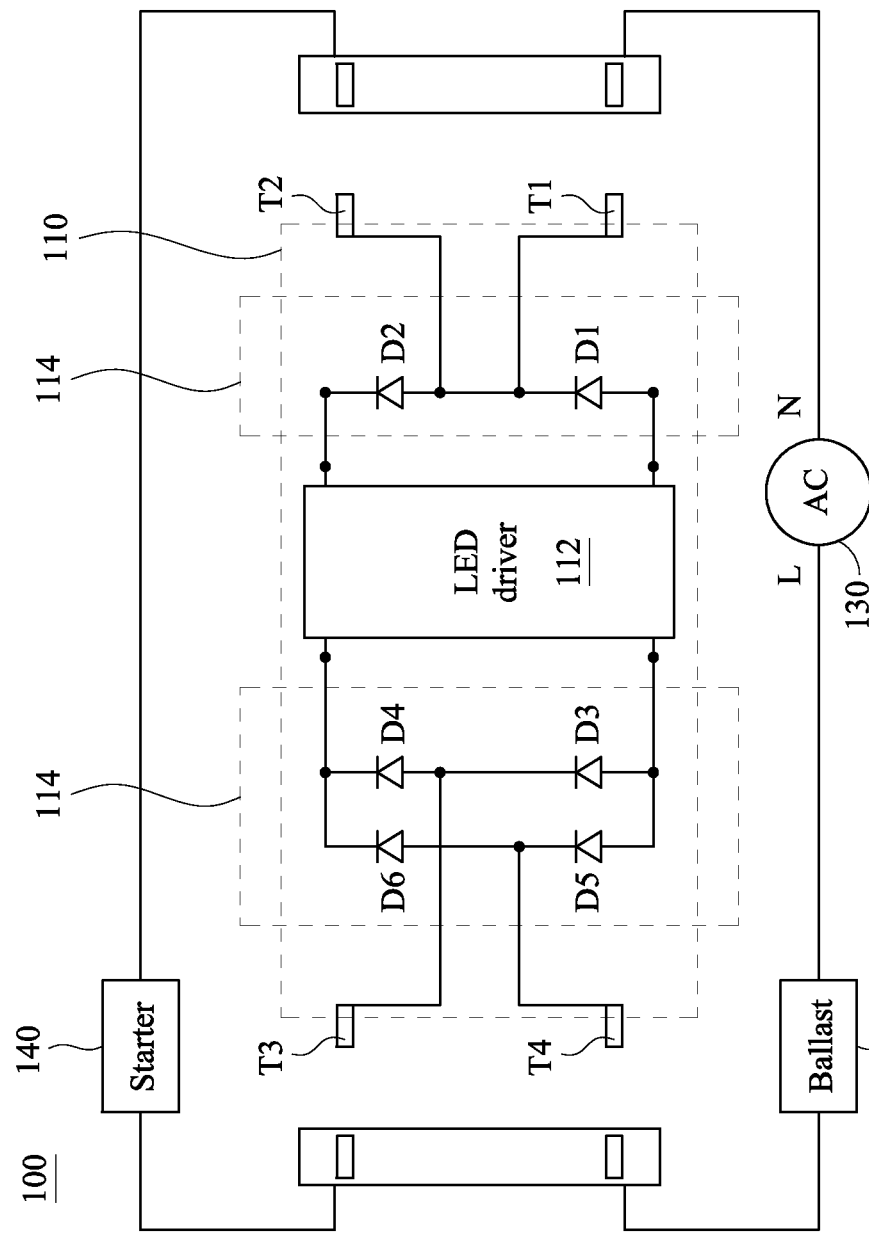
FIG. 1 shows a schematic diagram of a light-emitting diode light tube driving circuit according to one embodiment of the present disclosure.

FIG. 1 shows a schematic diagram of a light-emitting diode light tube driving circuit according to one embodiment of the present disclosure. As shown in FIG. 1, a lamp 100 includes a light-emitting diode (LED) light tube driving circuit 110 and a lamp socket (not shown). The LED light tube driving circuit 110 is used in the lamp socket with a ballast 120 and a starter 140. Moreover, the LED light tube driving circuit 110 includes a LED driver 112 and a rectifier unit 114.

The LED driver 112 is configured for receiving an operating voltage to drive at least one LED in the LED driver 112. The rectifier unit 114 has a first input/output terminal T1 and a second input/output terminal T2. The first input/output terminal T1 and the second input/output terminal T2 are selectively coupled to an external alternating-current power source 130. The rectifier unit 114 is configured for providing the operating voltage to the LED driver 112, such that at least one LED in the LED driver 112 emits light.

The aforementioned rectifier unit 114 further includes a first rectifier diode D1 and a second rectifier diode D2. An anode of the first rectifier diode D1 is electrically coupled to the LED driver 112, and a cathode of the first rectifier diode D1 is electrically coupled to the first input/output terminal T1 and the second input/output terminal T2. An anode of the second rectifier diode D2 is electrically coupled to the cathode of the first rectifier diode D1, the first input/output terminal T1 and the second input/output terminal T2, and a cathode of the second rectifier diode D2 is electrically coupled to the LED driver 112.

Furthermore, the aforementioned rectifier unit 114 further has a third input/output terminal T3, and further includes a third rectifier diode D3 and a fourth rectifier diode D4. An anode of the third rectifier diode D3 is electrically coupled to the LED driver 112, and a cathode of the third rectifier diode D3 is electrically coupled to the third input/output terminal T3. An anode of the fourth rectifier diode D4 is electrically coupled to the cathode of the third rectifier diode D3 and the third input/output terminal T3, and a cathode of the fourth rectifier diode D4 is electrically coupled to the LED driver 112.

Moreover, the aforementioned rectifier unit 114 further has a fourth input/output terminal T4, and further includes a fifth rectifier diode D5 and a sixth rectifier diode D6. An anode of the fifth rectifier diode D5 is electrically coupled to the LED driver 112, and a cathode of the fifth rectifier diode D5 is electrically coupled to the fourth input/output terminal T4. An anode of the sixth rectifier diode D6 is electrically coupled to the cathode of the fifth rectifier diode D5 and the fourth input/output terminal T4, and a cathode of the sixth rectifier diode D6 is electrically coupled to the LED driver 112.

Figure 2A:
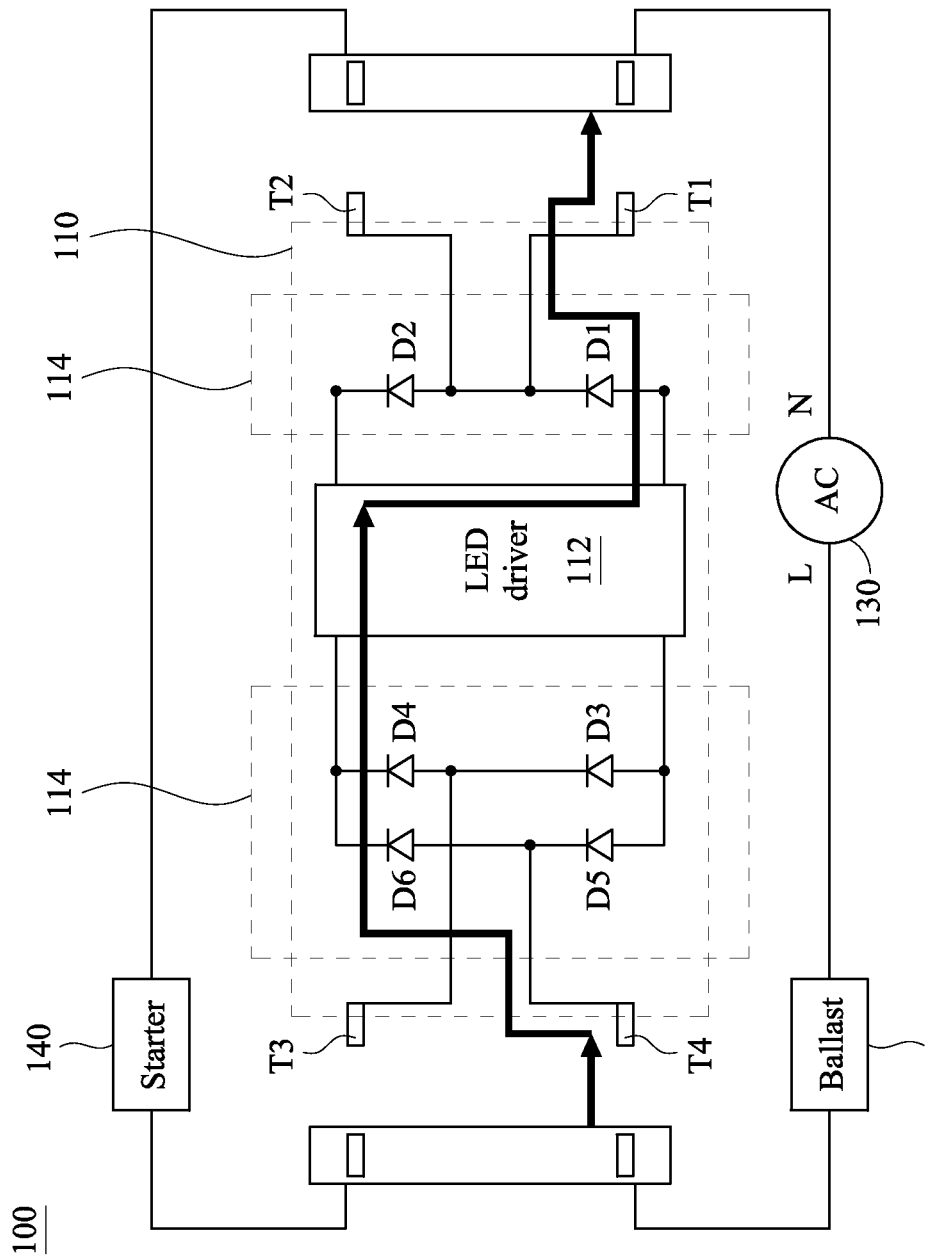
FIG. 2A shows an operating schematic diagram of a light-emitting diode light tube driving circuit in FIG. 1 according to one embodiment of the present disclosure.

FIGS. 2A-2D show schematic diagrams of operations of the light-emitting diode light tube driving circuit in FIG. 1 according to one embodiment of the present disclosure. As shown in FIG. 2A, when the LED light tube driving circuit 110 is forward-connected to the lamp socket, the first input/output terminal T1 is electrically coupled to the external alternating-current power source 130, the second input/output terminal T2 and the third input/output terminal T3 are electrically coupled to the starter 140, and the fourth input/output terminal T4 is electrically coupled to the ballast 120. At the moment, when a current is outputted from L (Line) terminal of the external alternating-current power source 130, the current is transmitted to the LED light tube driving circuit 110 through the ballast 120 by the fourth input/output terminal T4. Then, the current flows through the sixth rectifier diode D6, the LED driver 112 and the first rectifier diode D1. Finally, the current is outputted to the N (Neutral) terminal of the external alternating-current power source 130 by the first input/output terminal T1 to form a loop. The LED driver 112 receives the operating voltage in the loop, provided by the external alternating-current power source 130, to drive at least one LED in the LED driver 112 to emit light.

Figure 2B:
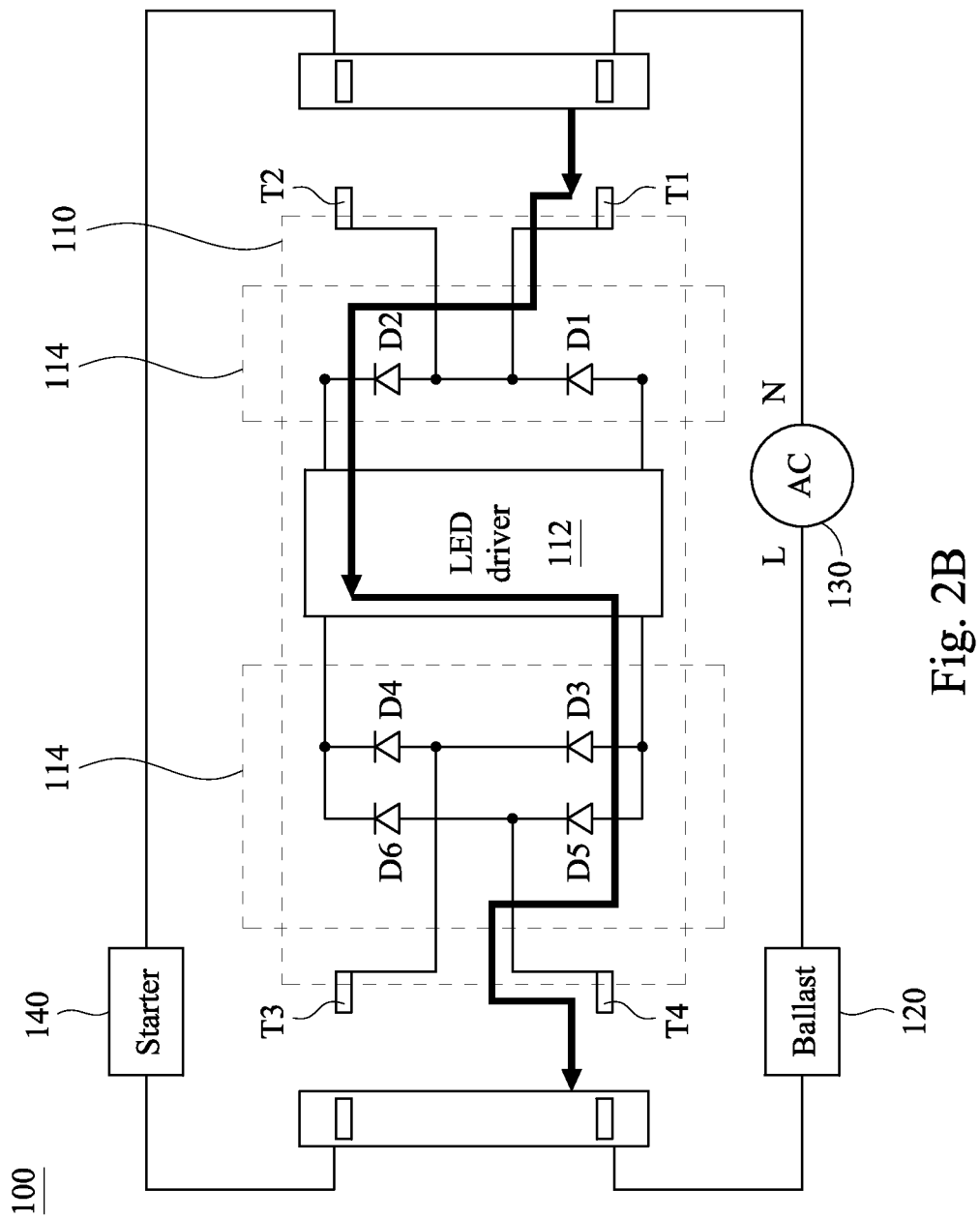
FIG. 2B shows an operating schematic diagram of a light-emitting diode light tube driving circuit in FIG. 1 according to one embodiment of the present disclosure.

As shown in FIG. 2B, when the LED light tube driving circuit 110 is forward-connected to the lamp socket and the current is outputted from the N (Neutral) terminal of the external alternating-current power source 130, the current is transmitted to the LED light tube driving circuit 110 by the first input/output terminal T1. Then, the current flows through the second rectifier diode D2, the LED driver 112 and the fifth rectifier diode D5. Finally, the current is outputted to the L (Line) terminal of the external alternating-current power source 130 through the ballast 120 by the fourth input/output terminal T4 to form the loop. The LED driver 112 receives the operating voltage in the loop, provided by the external alternating-current power source 130, to drive at least one LED in the LED driver 112 to emit light.

Figure 2C:
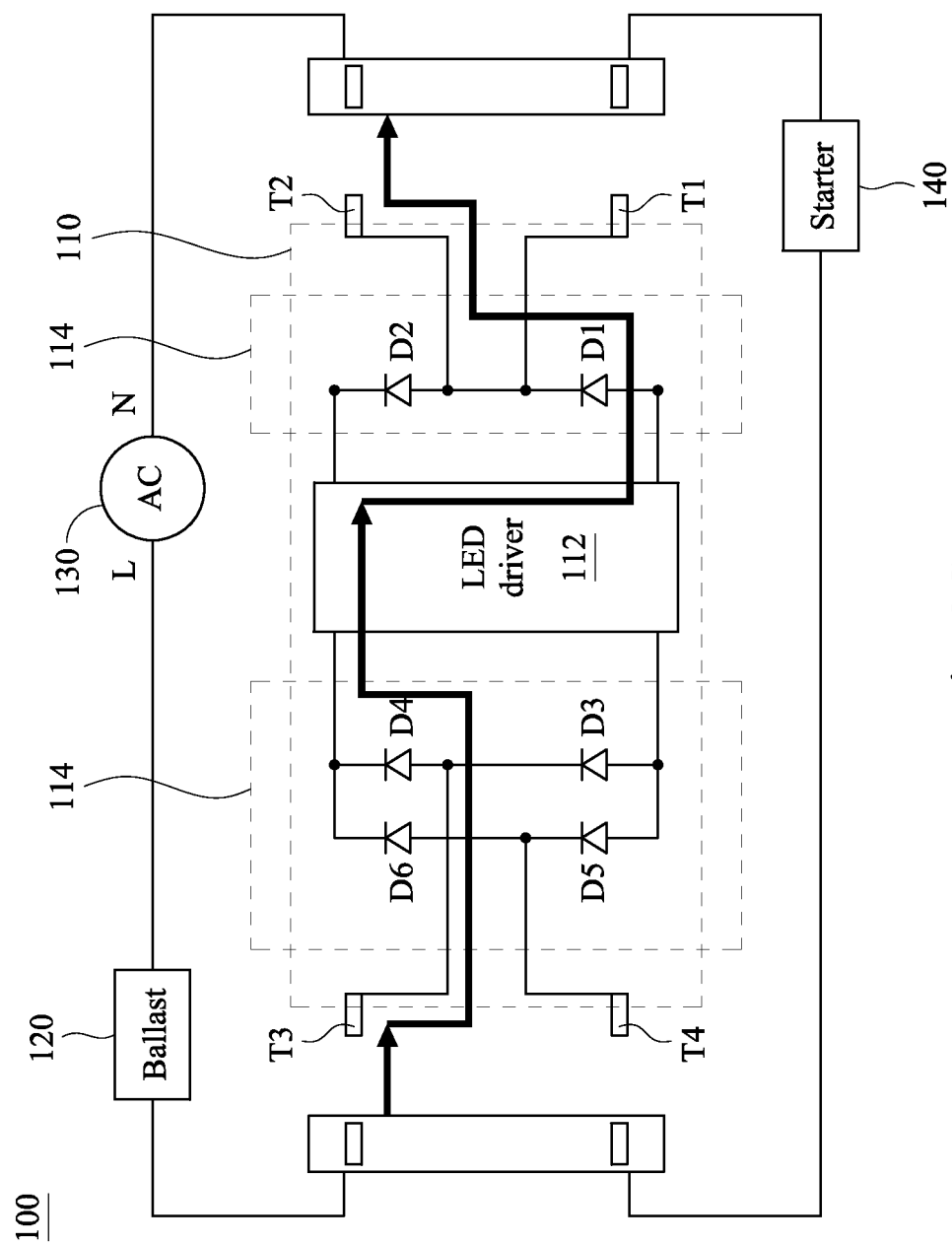
FIG. 2C shows an operating schematic diagram of a light-emitting diode light tube driving circuit in FIG. 1 according to one embodiment of the present disclosure.

As shown in FIG. 2C, when the LED light tube driving circuit 110 is backward-connected to the lamp socket, the first input/output terminal T1 and the fourth input/output terminal T4 are electrically coupled to the starter 140, the second input/output terminal T2 is electrically coupled to the external alternating-current power source 130, and the third input/output terminal T3 is electrically coupled to the ballast 120. At the moment, when the current is outputted from L (Line) terminal of the external alternating-current power source 130, the current is transmitted to the LED light tube driving circuit 110 through the ballast 120 by the third input/output terminal T3. Then, the current flows through the fourth rectifier diode D4, the LED driver 112 and the first rectifier diode D1. Finally, the current is outputted to the N (Neutral) terminal of the external alternating-current power source 130 by the second input/output terminal T2 to form the loop. The LED driver 112 receives the operating voltage in the loop, provided by the external alternating-current power source 130, to drive at least one LED in the LED driver 112 to emit light.

Figure 2D:
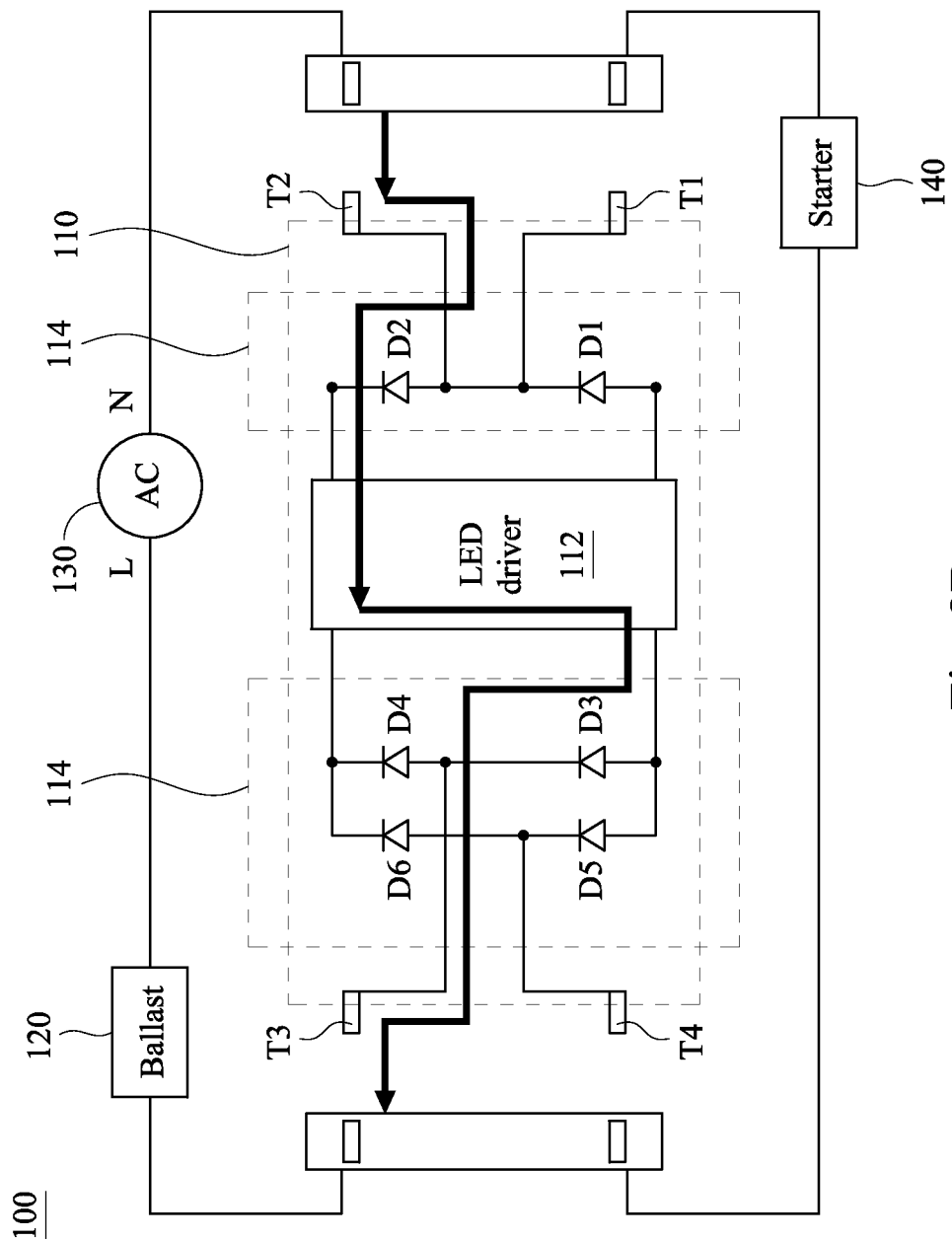
FIG. 2D shows an operating schematic diagram of a light-emitting diode light tube driving circuit in FIG. 1 according to one embodiment of the present disclosure.

As shown in FIG. 2D, when the LED light tube driving circuit 110 is backward-connected to the lamp socket and the current is outputted from the N (Neutral) terminal of the external alternating-current power source 130, the current is transmitted to the LED light tube driving circuit 110 by the second input/output terminal T2. Then, the current flows through the second rectifier diode D2, the LED driver 112 and the third rectifier diode D3. Finally, the current is outputted to the L (Line) terminal of the external alternating-current power source 130 through the ballast 120 by the third input/output terminal T3 to form the loop. The LED driver 112 receives the operating voltage in the loop, provided by the external alternating-current power source 130, to drive at least one LED in the LED driver 112 to emit light.

Furthermore, as shown in FIGS. 2A-2D, the aforementioned currents in the loops do not pass the starter 140 in the lamp socket. Therefore, both ends of the starter 140 can be regarded as an open-circuit. That is, when the LED light tube driving circuit 110 is set on a traditional lamp socket with the starter 140, the LED light tube driving circuit 110 will not be influenced by the starter 140 and is able to normally emit light.

In summary, only six rectifier diodes are used in the present disclosure to perform circuit rectification, such that the LED driver drives the LEDs therein to emit light. Moreover, in the present disclosure, the light-emitting diode light tube driving circuit can be directly set on the lamp socket of the traditional fluorescent light tube without removing the starter and without short-circuiting the ballast. Therefore, users are able to set LED light tubes more conveniently, and thus to achieve the purpose of saving power and environmental protection.

Although the specific embodiments are disclosed above, they are not intended to limit the disclosure. It will be apparent to those skilled in the art that various modifications and variations can be made to the structure of the present disclosure without departing from the scope or spirit of the disclosure. In view of the forgoing, it is intended that the present disclosure cover modifications and variations of this disclosure provided they fall within the scope of the following claims.

What is claimed is:

1. A light-emitting diode light tube driving circuit used in a lamp socket with a ballast, the light-emitting diode light tube driving circuit comprising:
   a light-emitting diode driver configured for receiving an operating voltage to drive at least one light-emitting diode; and
   a rectifier unit having a first input/output terminal and a second input/output terminal, and electrically coupled to an external alternating-current power source selectively through the first input/output terminal and the second input/output terminal, and configured for providing the operating voltage to the light-emitting diode driver, the rectifier unit comprising:
   a first rectifier diode, an anode of the first rectifier diode being electrically coupled to the light-emitting diode driver, a cathode of the first rectifier diode being electrically and directly coupled to the first input/output terminal and the second input/output terminal; and
   a second rectifier diode, an anode of the second rectifier diode being electrically and directly coupled to the cathode of the first rectifier diode, the first input/output terminal and the second input/output terminal, and a cathode of the second rectifier diode being electrically coupled to the light-emitting diode driver.

2. The light-emitting diode light tube driving circuit of claim 1, wherein the rectifier unit further has a third input/output terminal, and the rectifier unit further comprises:
   a third rectifier diode, an anode of the third rectifier diode being electrically coupled to the light-emitting diode driver, and a cathode of the third rectifier diode being electrically coupled to the third input/output terminal; and
   a fourth rectifier diode, an anode of the fourth rectifier diode being electrically coupled to the cathode of the third rectifier diode and the third input/output terminal, and a cathode of the fourth rectifier diode being electrically coupled to the light-emitting diode driver.

3. The light-emitting diode light tube driving circuit of claim 2, wherein the rectifier unit further has a fourth input/output terminal, and the rectifier unit further comprises:
a fifth rectifier diode, an anode of the fifth rectifier diode being electrically coupled to the light-emitting diode driver, and a cathode of the fifth rectifier diode being electrically coupled to the fourth input/output terminal; and
a sixth rectifier diode, an anode of the sixth rectifier diode being electrically coupled to the cathode of the fifth rectifier diode and the fourth input/output terminal, and a cathode of the sixth rectifier diode being electrically coupled to the light-emitting diode driver.

4. The light-emitting diode light tube driving circuit of claim 3, wherein when the light-emitting diode light tube driving circuit is forward-connected to the lamp socket, the first input/output terminal is electrically coupled to the external alternating-current power source, and the fourth input/output terminal is electrically coupled to the ballast.

5. The light-emitting diode light tube driving circuit of claim 3, wherein when the light-emitting diode light tube driving circuit is backward-connected to the lamp socket, the second input/output terminal is electrically coupled to the external alternating-current power source, and the third input/output terminal is electrically coupled to the ballast.

6. The light-emitting diode light tube driving circuit of claim 2, wherein when the light-emitting diode light tube driving circuit is backward-connected to the lamp socket, the second input/output terminal is electrically coupled to the external alternating-current power source, and the third input/output terminal is electrically coupled to the ballast.

7. The light-emitting diode light tube driving circuit of claim 3, further comprising:
a starter;
wherein when the light-emitting diode light tube driving circuit is forward-connected to the lamp socket, the second input/output terminal and the third input/output terminal are electrically coupled to the starter; and
wherein when the light-emitting diode light tube driving circuit is backward-connected to the lamp socket, the first input/output terminal and the fourth input/output terminal are electrically coupled to the starter.

8. A light-emitting diode light tube driving circuit used in a lamp socket with a ballast, the light-emitting diode light tube driving circuit comprising:
a light-emitting diode driver configured for receiving an operating voltage to drive at least one light-emitting diode;
a first rectifier diode, an anode of the first rectifier diode being electrically coupled to the light-emitting diode driver, and a cathode of the first rectifier diode being electrically and directly coupled to a first input/output terminal and a second input/output terminal;
a second rectifier diode, an anode of the second rectifier diode being electrically and directly coupled to the cathode of the first rectifier diode, the first input/output terminal and the second input/output terminal, and a cathode of the second rectifier diode being electrically coupled to the light-emitting diode driver;
a third rectifier diode, an anode of the third rectifier diode being electrically coupled to the light-emitting diode driver, and a cathode of the third rectifier diode being electrically coupled to a third input/output terminal;
a fourth rectifier diode, an anode of the fourth rectifier diode being electrically coupled to the cathode of the third rectifier diode and the third input/output terminal, and a cathode of the fourth rectifier diode being electrically coupled to the light-emitting diode driver;
a fifth rectifier diode, an anode of the fifth rectifier diode being electrically coupled to the light-emitting diode driver, and a cathode of the fifth rectifier diode being electrically coupled to a fourth input/output terminal; and
a sixth rectifier diode, an anode of the sixth rectifier diode being electrically coupled to the cathode of the fifth rectifier diode and the fourth input/output terminal, and a cathode of the sixth rectifier diode being electrically coupled to the light-emitting diode driver.

9. The light-emitting diode light tube driving circuit of claim 8, wherein when the light-emitting diode light tube driving circuit is forward-connected to the lamp socket, the first input/output terminal is electrically coupled to an external alternating-current power source, and the fourth input/output terminal is electrically coupled to the ballast.

10. The light-emitting diode light tube driving circuit of claim 8, wherein when the light-emitting diode light tube driving circuit is backward-connected to the lamp socket, the second input/output terminal is electrically coupled to an external alternating-current power source, and the third input/output terminal is electrically coupled to the ballast.

11. The light-emitting diode light tube driving circuit of claim 8, further comprising:
a starter;
wherein when the light-emitting diode light tube driving circuit is forward-connected to the lamp socket, the second input/output terminal and the third input/output terminal are electrically coupled to the starter; and
wherein when the light-emitting diode light tube driving circuit is backward-connected to the lamp socket, the first input/output terminal and the fourth input/output terminal are electrically coupled to the starter.

* * * * *